United States Patent [19]
Deitz, Sr. et al.

[11] Patent Number: 5,666,452
[45] Date of Patent: Sep. 9, 1997

[54] SHIELDING TAPE FOR PLENUM RATED CABLES

[75] Inventors: Gregory S. Deitz, Sr.; Timothy N. Berelsman, both of Richmond, Ind.

[73] Assignee: Belden Wire & Cable Company, Richmond, Ind.

[21] Appl. No.: 246,515

[22] Filed: May 20, 1994

[51] Int. Cl.$^6$ ........................................... G02B 6/44
[52] U.S. Cl. .................. 385/100; 385/106; 385/101; 174/24
[58] Field of Search ........................ 385/100, 101–114; 174/24, 27, 35 R

[56] References Cited

U.S. PATENT DOCUMENTS

| | | | |
|---|---|---|---|
| 4,272,155 | 6/1981 | Slaughter | 385/101 X |
| 5,237,635 | 8/1993 | Lai | 385/101 |

*Primary Examiner*—Phan T. H. Palmer
*Attorney, Agent, or Firm*—Laff, Whitesel, Conte & Saret, Ltd.

[57] ABSTRACT

A plenum rated cable having a core that includes a transmission medium of one or more copper or tin-copper conductors having thereon an insulating layer of an ethylene-chloro tetrafluoro ethylene composition. A first shield surrounds the core and extends longitudinally within and parallel to the length of the cable and includes a first layer of aluminum material and a second layer of cellulose acetate or polypropylene. The first and second layers are bonded together. A second shield surrounds the first shield and extends longitudinally within and parallel to the length of the cable and includes a first layer of aluminum and a second layer of cellulose acetate or polypropylene. The first and second layers are bonded together. A drain wire drains leakage within the cable generated from the current and allows for easy termination of the shield to the connector. A thermoplastic jacket encloses the drain wire and longitudinally surrounds the second shield and is made of a polyvinyl chloride composition.

13 Claims, 2 Drawing Sheets

SHIELDING TAPE FOR PLENUM RATED CABLES

FIELD OF THE INVENTION

This invention relates to cables. More particularly, this invention relates to cellulose or polypropylene backed shielding tape for plenum rated cables and for cable applications requiring limited smoke designs.

BACKGROUND OF THE INVENTION

Polyester backed shielding tapes are widely used in plenum rated products, such as plenum rated cables. Typically, these polyester backed shielding tapes are used in conjunction with a low cost plenum polyvinyl chloride compound. However, an undesirable synergistic effect often occurs between the polyester in the shielding tape and the polyvinyl chloride compound. As a result, this synergistic effect increases the chances that the construction of the plenum rated product will fail the peak and/or average low smoke and flammability requirements of the underwriters Laboratories, Inc. (UL) 910 plenum flame test. In addition, the aforementioned synergistic effect increases the chances that the construction of cables with a limited smoke design such as, for example, found in many non-plenum cables, will fail the limited smoke requirements of the UL 1685 fire-propagation and smoke release tests. The requirements of each test are briefly described below.

The UL 910 plenum flame test criteria are as follows. First, the flame spread or propagation must be less than or equal to five (5) feet. Second, peak smoke must be less than or equal to 0.50. Third, average smoke must be less than or equal to 0.15. Likewise, the criteria of the UL 1685 (UL Method & CSA FT4 Method) fire-propagation and smoke-release test is as follows. First, the cable damage height (for cables which have been exposed to a flaming ignition source) is to be less than 8 feet, 0 inches (244 cm) for UL1685 (UL Method) and 150 cm or less for UL 1685 (CSA-FT/4 Method) when measured from the bottom of the cable tray. Second, the total smoke released is to be 95 m2 or less for UL1685 (UL Method) 150 m2 or less for UL 1685 (CSA-FT/4 Method). Third, the peak smoke release rate is to be 0.25 m2/s or less for UL1685 (UL Method) and 0.40m2/s or less for UL 1685 (CSA-FT/4 Method).

As a result of the aforementioned test requirements, the known plenum rated cables generally fail to comply with the low smoke and flammability requirements of the UL-910 plenum flame test, while cables with limited smoke designs, such as with many non-plenum cables, generally fail to comply with the fire-propagation and smoke-release requirements of the UL 1685.

Thus, efforts have been made to comply with the requirements of the UL-910 plenum flame test and the UL 1685 limited smoke criteria to eliminate the above-described smoke problems associated with the use of polyester backed shielding tapes. Specifically, the jacket material in plenum rated cables has been changed from a low temperature thermoplastic material to SOLEF which is a polyvinylidene fluoride based copolymer (PVDF) and a trademark of Solvay Chemicals. The low temperature thermoplastic material and the use of SOLEF in the jacket both protect the inside of the cable which can typically be flame or limited smoke resistant. However, the use of SOLEF in the jacket is preferred over the low temperature thermoplastic material as it generally appears to resolve the aforementioned smoke problems. Thus, while the use of SOLEF as, a jacket material appears to resolve the smoke problems, its use significantly increases the cost of the cables.

In addition to the above-mentioned polyester backed shielding tapes and SOLEF, there are other materials which are used in cables. One such material is polypropylene which is typically used as an insulator on individual conductors of cables. Aside from its use as an insulator, other uses for polypropylene include polypropylene backed shielding tapes in non-plenum applications. Because polypropylene backed shielding tape can take folds, no compromises in the shielding effectiveness in the cable by increasing the chance of shield shorts have been noted. Thus, polypropylene backed shielding tape is effective for completely minimizing smoke generation in cables. However, polypropylene backed shielding tape has been shown to be effective for applications where limited smoke UL 1685 criteria have to be met as well as UL-910 requirements.

TEFLON is also used as a conductor insulation in cables but has smoke-related problems similar to those described above and has a relatively high cost factor.

Another material often found in cables is polyethylene. However, because polyethylene readily ignites, it does not comply with the UL-910 plenum flame test. Thus, polyethylene is most commonly used in non-plenum applications.

To date, the known polyester backed shielding tapes generally do not comply with the requirements of the UL-910 plenum flame test. The use of SOLEF typically generates prohibitively high manufacturing costs. In addition, TEFLON includes limitations similar to those described in relation to SOLEF whereas, polyethylene readily ignites and cannot be used for plenum application. Thus, economic materials which may be used in plenum rated products and, at the same time, which satisfy the low smoke and flammability requirements and the limited smoke requirements of the UL-910 plenum flame test and the UL 1685 respectively, are needed.

SUMMARY OF THE INVENTION

Accordingly, it is an object of the present invention to provide a foil shielded plenum rated cable which complies with the low and limited smoke requirements of the UL-910 plenum flame test and the UL 1685 test.

It is another object of the present invention to provide a foil shielded plenum rated cable which eliminates the synergistic effect between the backing material on the foil shield and the low cost plenum polyvinyl chloride compound found in most plenum cables.

It is yet another object of the present invention to provide a foil shielded plenum rated cable that has lower production costs due to the utilization of relatively inexpensive cable materials.

The objectives and advantages of the present invention are achieved, in a preferred embodiment, by providing a foil shielded plenum rated cable that includes, in part, a core having a transmission medium which preferably consists of copper or tin-copper conductors. An insulating layer preferably of an ethylene-chloro tetrafluoro ethylene copolymer (E-CTFE) or a fluorinated ethylene-polypropylene (FEP) composition covers the conductors. When the core contains a plurality of twisted-pair insulated conductors, a separate first shield surrounds each twisted pair of insulated conductors and each first shield preferably extends longitudinally within and parallel to the length of the cable. Each of the first shields includes a first layer of aluminum material and a second layer of a low temperature smoke resistant thermoplastic composition which passes the UL-910 plenum flame test and UL-1685 smoke test. A preferred compound is cellulose acetate or polypropylene tape. The first and second layers are bonded together with the use of adhesive. A second shield surrounds the first shield and extends longitudinally within and parallel to the length of the cable. The second shield includes a first layer of aluminum and a second layer of the preferred cellulose acetate or polypropylene. Similarly to the first shield, the first and second layers are bonded together.

A drain wire is located longitudinally within the cable and parallel to the conductors and provides a means for draining leakage generated from the current. A thermoplastic jacket encloses the drain wire and longitudinally surrounds the second shield. The jacket is preferably a flame retardant low smoke polyvinyl chloride composition.

In another embodiment, the cable includes only a single shielding tape which surrounds the core and preferably extends longitudinally within and parallel to the length of the cable. The single shielding tape includes a first layer of aluminum material and a second layer of the low temperature smoke resistant thermoplastic composition.

In still another embodiment, the cable includes only a plurality of first shielding tapes which surround each twisted-pair of insulated conductors in the core and each preferably extends longitudinally within and parallel to the length of the cable. The first shielding tapes have a first layer of aluminum material and a second layer of the low temperature smoke resistant thermoplastic composition.

The low temperature smoke resistant thermoplastic non-fluorinated composition backed shielding tape in either of the aforementioned embodiments may be folded without damage to its structural integrity.

Thus, the invention provides a plenum rated cable that complies with the low smoke, limited smoke, and flammability requirements of the UL-910 plenum flame test and the UL 1685 test. The inventive cable accomplishes this by preferably including at least one cellulose compound backed shielding tape. The structural integrity of the cellulose compound backed shielding tape is such that it allows for the tape to be folded without compromising its shielding effectiveness.

The above, as well as other objects and advantages of the invention, will become apparent from the following detailed description of the preferred embodiments, reference being made to the accompanying drawings

DETAILED DESCRIPTION OF THE INVENTION

Figure 1:
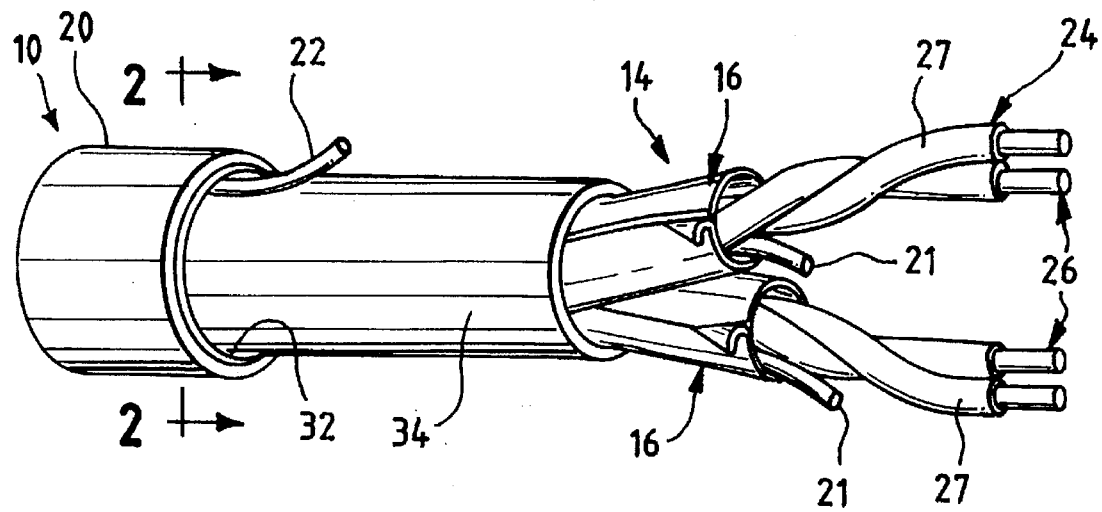
FIG. 1 a perspective view of the preferred embodiment of the inventive cable.
Figure 2:
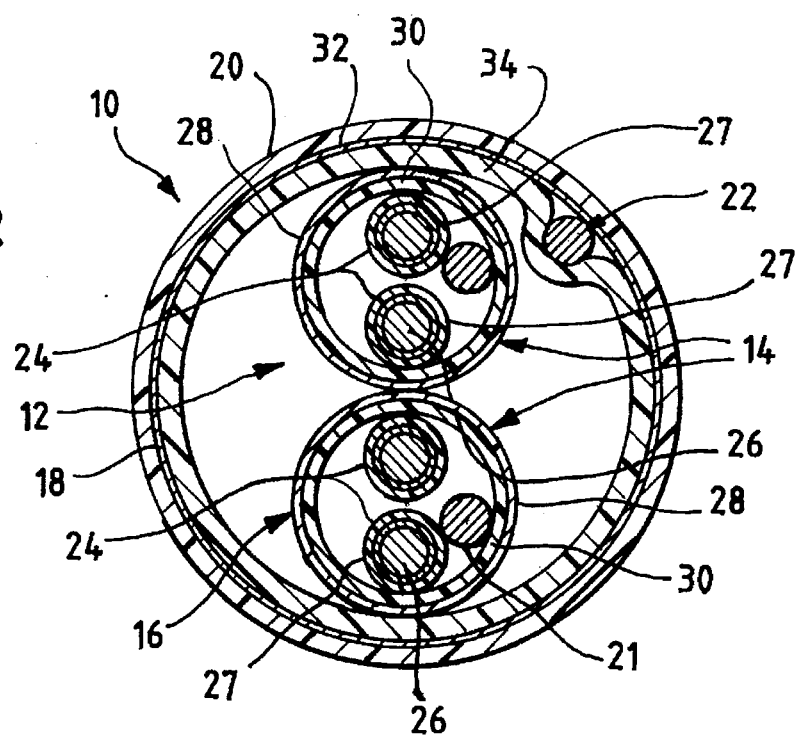
FIG. 2 is a cross-sectional view of the cable, taken along lines 2—2 of FIG. 1.

Generally referring first to FIGS. 1 and 2, the present invention, in one embodiment, provides a plenum rated cable generally denoted by the numeral 10, that includes a core 12 with a transmission medium 14 of a plurality of twisted-pair cables 24, a plurality of first shields 16 covering each twisted-pair cable, a second shield 18 covering the first shields, and a thermoplastic jacket 20. A drain or ground wire 21 is located between each first shield and the respective twisted-pair cable and another drain or ground wire 22 is located between the second shield 18 and the jacket 20 of the cable.

In the preferred embodiment, transmission medium 14 consists of several twisted pairs 24 of insulated metallic conductors 26 (FIGS. 1 and 4) which are formed by twisting together two insulated conductors with a mechanical twisting cabler (not shown). Each of the metallic conductors 26 are generally made of solid or stranded metallic conducting materials, i.e., copper or tin-coated copper, and are covered with an insulating material 27 prior to the twisting progress. The insulating material is preferably ethylene-chloro tetrafluoro ethylene copolymer (E-CTFE) material such as sold by Ausimont under the trademark of Halar or a fluorinated ethylene-propylene copolymer such as that sold under the trademark of TEFLON-FEP.

Figure 3:
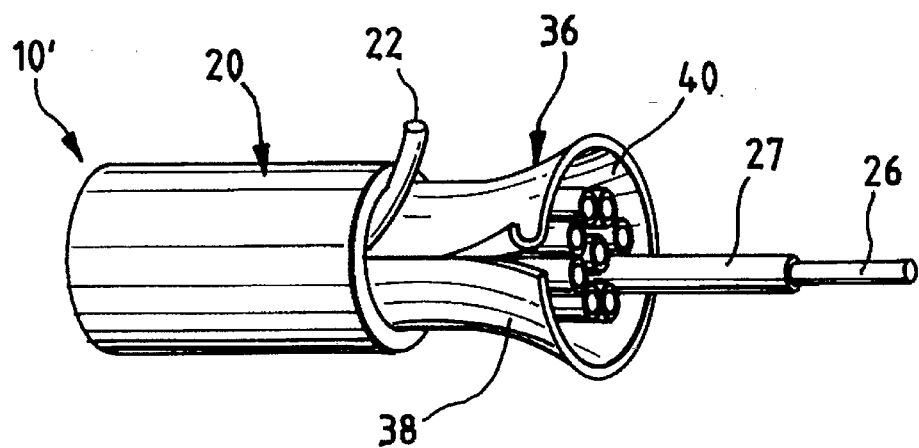
FIG. 3 is a perspective view of another embodiment of the inventive cable.

In the embodiment of FIG. 3, the conductors are not twisted together but instead are arranged within the cable in parallel relation to one another. In the above embodiments, conductors 26 are covered with about 5 to about 12 mils of insulation with the preferred being about 7 mils of FEP insulation or about 10 mils of Halar insulation.

The first shield surrounds core 12 and extends longitudinally within and parallel to the length of the cable (FIGS. 1 and 2). Each first shield 16 comprises a first layer 28 of aluminum material and a second layer 30 of a low temperature smoke resistance thermoplastic material. The term "low temperature" covers thermoplastics having a melting point of between about 100° C. and about 200 ° C. The terms "smoke resistant" and "limited smoke" cover a material which will pass the requirements for the UL 910, the UL 1685 test, respectively. A preferred material is a cellulose material and preferably a cellulose acetate. Alternatively, polypropylene is used. The cellulose acetate layer or the polypropylene layer is bonded to aluminum foil shield using an appropriate bonding material such as ethylene acrylic acetate. The cellulose acetate or polypropylene layer 30 faces the interior of the core whereas the aluminum layer 28 is the outside surface and faces the cover 20.

The second shield 18 surrounds all of the first shields 16 and extends longitudinally within and parallel to the length of the cable (FIGS. 1 and 2). Second shield 18 includes a first outside layer 32 of aluminum and a second inner layer 34 of cellulose acetate or polypropylene. Similarly to the layers in the first shield, the layers in the second shield are bonded together using an appropriate bonding material such as ethylene acrylic acetate. The inner layer 34 faces the first shield outer layer 28.

In both first and second shields, 16 and 18, respectively, first outer layers 28, 32 of aluminum material is from about 0.00030 inches to about 0.001 inches in thickness and preferably is 0.0007 inches in thickness. Likewise, second inner layer 30 of cellulose acetate or polypropylene in first shield 16 and second inner layer 34 of cellulose acetate or polypropylene in second shield 18 is from about 0.0005 inches to about 0.0030 inches in thickness and preferably is 0.0015 inches in thickness.

In another embodiment, the cable (designated by numeral 10') has an overall shield and therefore does not have both first and a second shields but instead includes a single shielding tape 36 which surrounds the core and extends longitudinally within and parallel to the length of the cable (FIG. 3). Single shielding tape 36 includes a first layer 38 of aluminum material and a second layer 40 of cellulose acetate or polypropylene. First and second layers 38 and 40, respectively, are also bonded together in the alternate embodiment. Moreover, the dimensions of the aluminum layer and the cellulose acetate or polypropylene layer in this embodiment are the same as the dimensions described above in relation to the embodiment of FIG. 1.

In still another embodiment, a cable 10 has a plurality of first shielding tapes 16 which surround each twisted-pair of insulated conductors 24 in the core and each preferably extends longitudinally within and parallel to the length of the cable. The first shielding tapes 16 have a first layer of aluminum material and a second layer of the low temperature smoke resistant thermoplastic composition i.e. cellulose acetate or polypropylene and a plurality of drain or ground wires 21.

Figure 4:
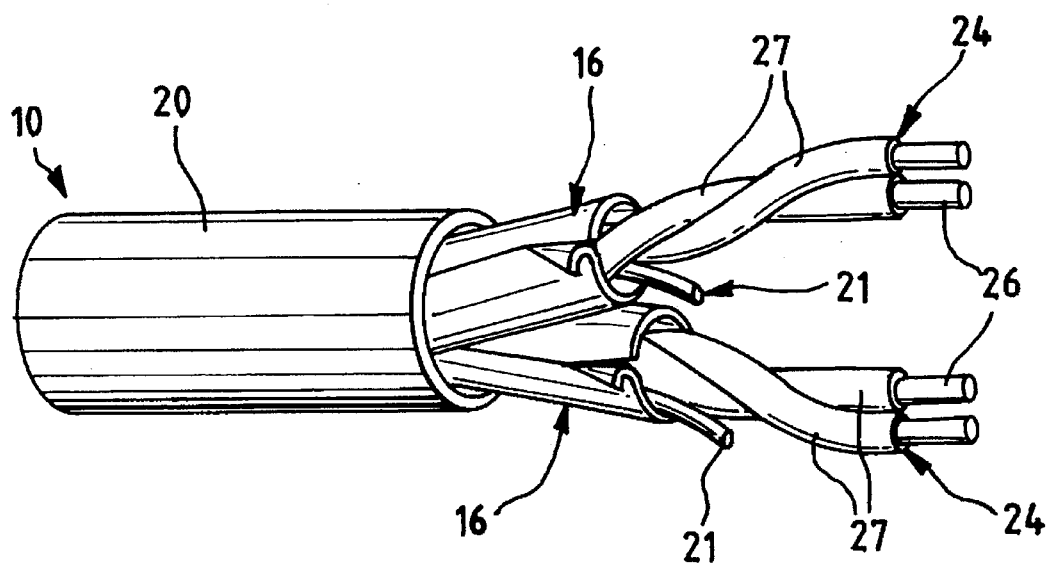
FIG. 4 is a perspective view of still another embodiment of the inventive cable.

Thermoplastic jacket 20 encloses and longitudinally surrounds second shield 18 in the embodiment or FIG. 1, the single shield 36 in the embodiment of FIG. 3 and the first shields in the embodiment of FIG. 4. Thermoplastic jacket 20 is preferably made of a polyvinyl chloride composition and is from about 0.010 inches to about 0.020 inches in thickness and preferably 0.015 inches in thickness. Alternatively, thermoplastic jacket 20 may be made of a low cost flame retarded thermoplastic material such as sold under the trademark of FLAMMAREST which is owned by Belden Wire and Cable Company.

Drain wires 21 and 22 are located longitudinally within the cable in both of the aforementioned embodiments and is parallel to the conductors. Drain wires 21 are located within each shield 16 between the shield 21 and the respective twisted-pair cable and drain wire 22 is located between jacket 20 and second shield 18 or shield 36. In all embodiments, drain wires 21 and 22 provide means for draining leakage within the cable generated from the current.

The following Examples illustrate the effectiveness of the inventive shielding tape.

EXAMPLE 1

Three different types of foil shields were subjected to a modified Arapahoe smoke chamber to evaluate the degree of smoke density left on a piece of filter paper. Specifically, the smoke density was observed for foil shields backed with Scotch tape, polyester, and polypropylene. The Scotch tape backed samples yielded the lowest degree of smoke, while the polypropylene backed samples were the next best and generated limited smoke. The Scotch tape backed samples were subsequently evaluated through the use of a Fourier Transform Infrared Spectrometer (FTIR) and found to primarily contain cellulose based material (FIG. 4). As shown in FIG. 4, the absorbance value of the cellulose based material (cellulose acetate) of the Scotch tape substrate showed a marked increase as the wavenumber value was in the range of 1000 to 1800.

EXAMPLE 2

Next, shielding tapes with cellulose, polypropylene, and polyester backings were evaluated for flame spread, peak smoke, and average smoke values, and then further to determine a passing or failing grade under the UL-910 plenum flame test requirements, as shown in Table 1, and described in further detail below.

The polyester backed shielding tapes were evaluated for both overall and individual shielded cables. In the overall shielded cables, 0.0005 inches of polyester was used on the tapes whereas, 0.0010 inches of polyester was used on the individually shielded tapes. Moreover, both FEP and Halar insulation was used in the overall shielded tapes, while only Halar insulation was used in the individually shielded tapes. Both the overall and the individually shielded tapes included 0.00035 inches of aluminum foil and outer jackets of 0.015 inches. As shown in Table 1 below, the test results indicated that the polyester backed shielding tapes in both the overall and the individually shielded cables did not pass the UL-910 plenum flame test.

The polypropylene backed shielding tapes were evaluated for individual shields only and showed a passing grade for the UL-910 plenum flame test. However, as Table 1 indicates, the peak smoke values for polypropylene were higher than those for the cellulose backed shielding tapes and, therefore, is optimal for application in products requiring limited smoke generation as required in UL-910 or UL-1685.

The cellulose backed shielding tapes were evaluated for both overall and individually shielded cables. In each instance, the cables included 0.0010 inches of cellulose material on the tape. As Table 1 indicates, the cellulose backed shielding tapes always passed the UL-910 plenum flame test and included the lowest values for the flame spread, peak smoke, and average smoke. Thus, the presence of cellulose acetate in the cables in each instance resulted in a considerable reduction in smoke generation and included the following data: a flame spread value of from about 0.5 feet to about 1.5 feet (maximum average allowed is 5 feet); a peak smoke value of from about 0.22 to about 0.34 (maximum allowed peak value is 0.50); and an average smoke value of from about 0.10 to about 0.15 (maximum average allowed is 0.15).

TABLE 1

| INSULATION TYPE | SHIELD TYPE | BACKING | FOIL TAPE | JACKET | FLM SPRD | PEAK SMK | AVG SMK | P/F |
|---|---|---|---|---|---|---|---|---|
| FEP | overall | polyes. | .00035" | .015" | 4.0' | .35 | .16 | F |
| FEP | overall | cellul. | " | " | 1.5' | .32 | .12 | P |
|  |  |  |  |  | 1.5' | .22 | .10 | P |
| Halar | overall | polyes. | " | " | 1.5' | .49 | .21 | F |
| Halar | indiv. | polyes. | " | " | 1.0' | .67 | .25 | F |
| Halar | indiv. | polyes. | " | " | 1.0' | .64 | .26 | F |
| Halar | indiv. | cellul. | " | " | 1.5' | .27 | .12 | P |
|  |  |  |  |  | 1.5' | .30 | .12 | P |
| Halar | indiv. | cellul. | " | " | 0.5' | .34 | .14 | P |
|  |  |  |  |  | 0.5' | .32 | .15 | P |
| Halar | indiv. | polypro. | " | " | 1.5' | .44 | .12 | P |
|  |  |  |  |  | 1.5' | .38 | .15 | P |

Therefore, it should be recognized that, while the invention has been described in relation to a preferred embodiment thereof, those skilled in the art may develop a wide variation of structural details without departing from the principles of the invention. Accordingly, the appended claims are to be construed to cover all equivalents falling within the true scope and spirit of the invention.

The invention claimed is:

1. A plenum rated cable comprising:

a cylindrical jacket having an internal wall defining a core, a plurality of first shields and a second shield, each of said first shields surrounding at least one pair of insulated conductors, said second shield surrounding said first shields, each of said first shields having a first layer of aluminum material and a second layer of low temperature smoke resistant cellulose or polypropylene material facing said conductors, and said first and second layers being bonded together.

2. The cable of claim 1 wherein said shield comprises a plurality of first shields, each of said first shield surrounding at least one twisted-pair insulated conductor, each of said first shields having a first layer of aluminum material and a second layer of cellulose or polypropylene material facing said conductors, and said first and second layers being bonded together.

3. The cable of claim 2 wherein said conductors are selected from copper, tin-copper and optical fiber.

4. The cable of claim 3 wherein said insulation on said conductor is selected from ethylene-chloro tetrafluoroethylene copolymer (E-CTFE) and fluorinated ethylene-polypropylene (FEP).

5. The cable of claim 4 wherein said insulation is from about 5 mils to about 12 mils in thickness.

6. The cable of claim 1 wherein said second shield has a first layer of aluminum material and a second layer of polypropylene or cellulose material.

7. The cable claim 6 wherein said second layer of said second shield is a cellulose acetate material.

8. The cable of claim 1 wherein said cellulose material comprises cellulose acetate.

9. A plenum rated cable comprising:

a core having a transmission medium, said transmission medium being a plurality of copper or tin-copper conductors, each having thereon an insulating layer composition selected from fluoroethylene-polypropylene and ethylene-chloro tetrafluoro ethylene copolymer composition;

at least one first shield surrounding said plurality of insulated conductors and extending longitudinally within and parallel to the length of said cable, said first shield having a first layer of aluminum material and a second layer of cellulose acetate, said first and second layers being bonded together;

a second shield surrounding said at least one first shield and extending longitudinally within and parallel to the length of said cable, said second shield having a first layer of aluminum and a second layer of cellulose acetate or polypropylene, said first and second layers being bonded together; and a thermoplastic jacket which encloses and longitudinally surrounds said second shield, said jacket comprising a polyvinyl chloride composition.

10. The cable of claim 9 wherein said insulating layer is from about 5 mils to about 12 mils.

11. The cable of claim 10 wherein said thermoplastic jacket is from about 0.010 inches to about 0.020 inches in thickness.

12. The cable of claim 10 wherein said first layer of aluminum material in said first and said second shields is from about 0.00030 inches to about 0.001 inches in thickness.

13. The cable of claim 9 wherein said second layer of cellulose acetate in said first shield and said second layer of cellulose acetate or polypropylene material in said second shield is from about 0.0005 inches to about 0.0030 inches in thickness.

* * * * *

UNITED STATES PATENT AND TRADEMARK OFFICE
CERTIFICATE OF CORRECTION

PATENT NO. : 5,666,452
DATED : September 9, 1997
INVENTOR(S) : Deitz, Sr. et al

It is certified that error appears in the above-indentified patent and that said Letters Patent is hereby corrected as shown below:

On the title page, Item [75] the inventor's name should be changed to -- Gregory J. Deitz, Sr. --.

Col. 2, line 58, delete "ethylene-chloro tetrafluoro ethylene" and insert -- ethylenechloro-trifluoroethylene --.

Col. 4, line 13, delete "ethylene-chloro tetrafluoro ethylene" and insert -- ethylenechloro-trifluoroethylene --.

Claim 4, lines 2 & 3 "ethylene-chloro tetrafluoro ethylene" and insert -- ethylenechloro-trifluoroethylene --.

Claim 9, line 6, "ethylene-chloro tetrafluoro ethylene" and insert -- ethylenechloro-trifluoroethylene --.

In the Abstract, delete "ethylene-chloro tetrafluoro ethylene" and insert -- ethylenechloro-trifluoroethylene --.

Signed and Sealed this

Twenty-fourth Day of February, 1998

*Attest:*

BRUCE LEHMAN

*Attesting Officer*     *Commissioner of Patents and Trademarks*